(12) United States Patent
Lien

(10) Patent No.: US 7,496,744 B2
(45) Date of Patent: Feb. 24, 2009

(54) METHOD FOR BOOTING COMPUTER MULTIMEDIA SYSTEM WITH HIGH SPEED DATA STORAGE

(75) Inventor: Che-Liang Lien, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 486 days.

(21) Appl. No.: 11/242,826

(22) Filed: Oct. 5, 2005

(65) Prior Publication Data

US 2007/0028082 A1    Feb. 1, 2007

(30) Foreign Application Priority Data

Jul. 26, 2005    (TW) .............. 94125324 A

(51) Int. Cl.
*G06F 15/177* (2006.01)
(52) U.S. Cl. ............................. 713/2; 713/1
(58) Field of Classification Search .............. 713/1, 713/2, 100
See application file for complete search history.

(56) References Cited

U.S. PATENT DOCUMENTS 6,763,458 B1 *  7/2004  Watanabe et al. .......... 713/100
6,892,323 B2    5/2005  Lin
2004/0093489 A1 *  5/2004  Hsu ............................ 713/2

FOREIGN PATENT DOCUMENTS

| TW | 591377 | 6/2004 |
|---|---|---|
| TW | I232380 | 5/2005 |

OTHER PUBLICATIONS

Communication from the German Patent Office regarding a corresponding German Patent Application 10 2005 059 956 dated Oct. 30, 2007.

* cited by examiner

*Primary Examiner*—Chun Cao
(74) *Attorney, Agent, or Firm*—Rosenberg, Klein & Lee

(57) ABSTRACT

A method for express execution of multimedia playing for a computer multimedia system to load kernel operating system from a high speed data storage is provided. The computer of the computer multimedia system has a central processing unit, a data storage, a system memory, a BIOS, a plurality of hot keys, and a plurality of multimedia devices, and a high speed data storage connected to the central processing unit through a bus. When a hot key is detected to be operated, the computer loads and executes the second operating system and kernel to system memory, and loads and executes the multimedia device driver and multimedia device application program for the multimedia device associated with the pressed hot key. The high speed data storage is a memory chip or a flash memory.

15 Claims, 4 Drawing Sheets

METHOD FOR BOOTING COMPUTER MULTIMEDIA SYSTEM WITH HIGH SPEED DATA STORAGE

FIELD OF THE INVENTION

The present invention relates to a method for booting computer multimedia devices and, more particularly, to a method for fast executing computer partitions by loading operating system kernel partitions from a high speed memory.

BACKGROUND OF THE INVENTION

As the computer technology continuously progresses, the computer-based multimedia system, constructed with a computer and multimedia devices, is widely used in various occasions, such as offices, households, and business locations. In addition, intelligent appliances (IA) integrated computer devices is also gaining popularity.

However, the design of the conventional computer-based multimedia systems and IA is basically linking an audiovisual player or an IA device to a computer system through a computer interface. With this type of design, the user usually needs to boot the computer system in order to activate and operate the audiovisual player or the IA. In other words, the user must wait until the computer system completes the BIOS program initialization, POST program, peripheral detection and driving, OS activation, system configuration, and so on, before the user can execute the audiovisual program to play the audiovisual data.

To speed up the booting process of the computer-based system, a conventional way is to install a second operating system in another segment of the hard disk for activating multimedia playing or IA functions and shortening the booting time.

SUMMARY OF THE INVENTION

However, although the current solutions provide the users with the options of either normal booting of the computer system or activating the multimedia or IA device for operation, the computer system still needs to read the operating system from the hard disk at the beginning of the booting process. During the execution of the hard disk driver, application programs or data accesses, the computer system is restricted by the speed of the hard disk. Although the hard disk has the advantage of large capacity for data storage, the access speed to the hard disk is still slow in comparison with other storage devices, such as high speed memory, memory chips, and flash memory.

Therefore, a primary objective of the present invention is to provide a method for fast execution of computer programs. Without the normal booting of a computer system, the method uses a high speed storage unit to boot the computer system to accomplish the fast activation and control of a multimedia or IA device.

Another objective of the present invention is to provide a method for fast execution of computer partitions by loading the operating system kernel program from a high speed memory. The method connects the computer system to a high speed memory. When the operation of a hot key is actuated, the computer system loads the operating system kernel partitions from the high speed data storage to the system memory of the computer and starts execution.

To achieve the aforementioned objectives, the present invention connects a computer system with a hard disk, a system memory, a BIOS, at least a hot key, at least a multimedia device, and a high speed memory. The computer system can operate either under normal computer mode or fast multimedia activation and playing mode. When the computer system is booted normally, the computer loads and executes a first operating system from the hard disk. When the operation of the hot key is detected, the computer loads and executes a second operating system from the high speed data storage to the system memory. The computer then loads and executes the multimedia device driver and application programs so that the multimedia device associated with the hot key is ready for operation. The high speed data storage can be memory chips or flash memory.

Since the present invention connects a high speed data storage to a computer, when the computer detects a hot key being actuated, the computer loads and executes the operating system and kernel partitions from the high speed data storage to a system memory. As the high speed data storage has a higher data access speed than the hard disk, the booting time for the multimedia or IA device is shortened.

These and other objects, features, and advantages of the invention will be apparent to those skilled in the art, from a reading of the following brief description of the drawings, the detailed description of the best modes for carrying out the invention, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
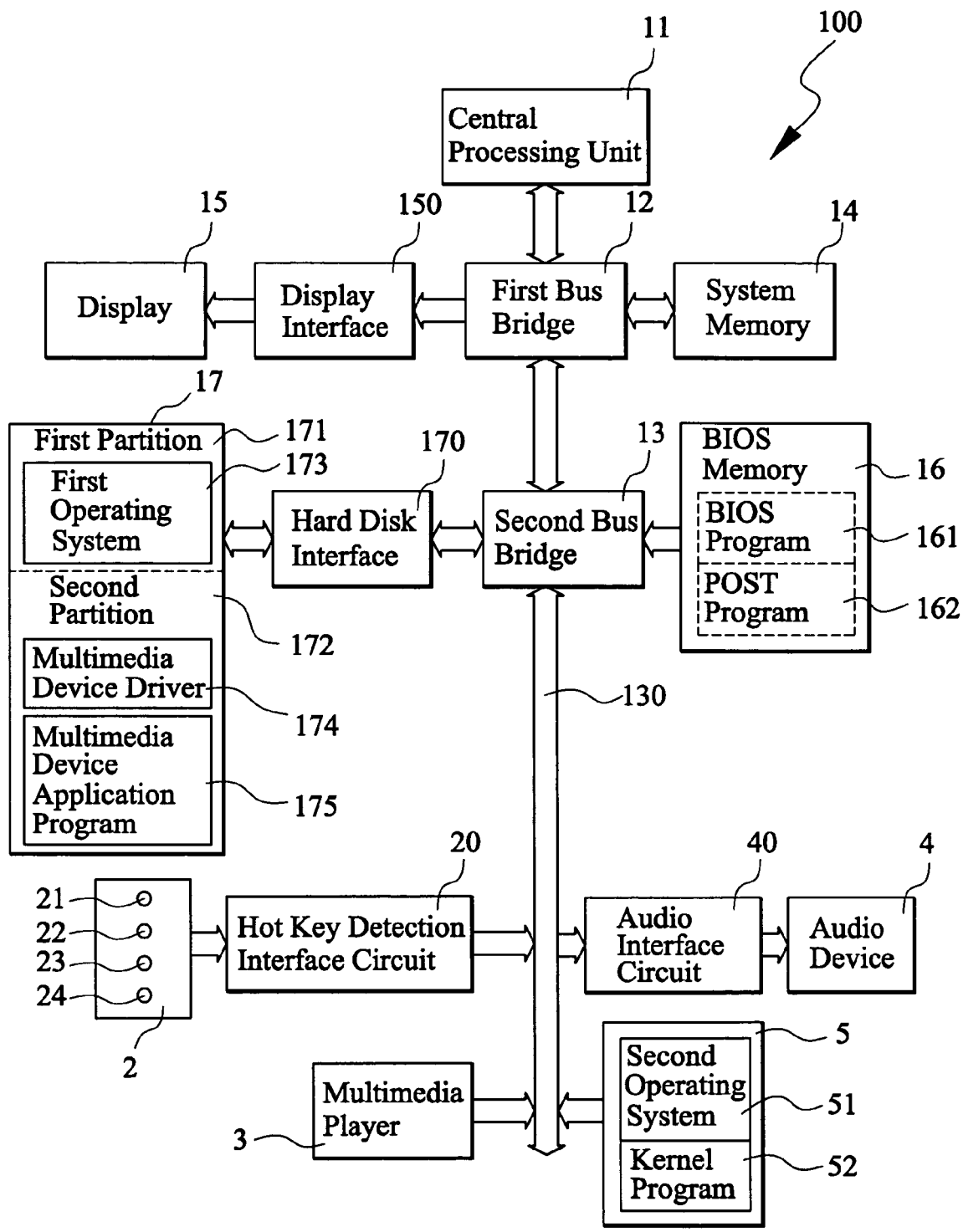
FIG. 1 shows a system functional block diagram of the first embodiment of the present invention.

With reference to the drawings and in particular to FIG. 1, which shows a system functional block diagram in accordance with a first embodiment of the present invention, a computer 100 comprises a central processing unit 11, a first bus bridge 12, and a second bus bridge 13. The central processing unit 11 is connected to the first bus bridge 12 through a system bus. The first bus bridge 12 is connected to a system memory 14 and is connected to a display 15 through a display interface 150.

The second bus bridge 13 is connected to a BIOS memory 16. The BIOS memory 16 stores a BIOS program 161 and a power on self test (POST) program 162, both required for booting said computer.

The second bus bridge 13 is connected to a hard disk interface 170 through a bus. The hard disk interface 170 is connected to a hard disk 17. The hard disk 17 is the data storage of the present invention. The hard disk 17 is divided into a first partition 171 and a second partition 172. The first partition 171 is installed with a first operating system 173 as well as device drivers and application programs supporting the first operating system 173. The second partition 172 stores a multimedia device driver 174 and a multimedia device application program 175.

The first operating system 173 can be the currently popular Windows operating system. The multimedia device driver 174 in the second partition 172 includes CD player driver, digital music device driver, VCD player driver and TV signal receiving device driver. The multimedia device application program 175 includes CD player application program, digital music device application program, VCD player application program and TV playing application.

The multimedia device driver 174 and the multimedia device application program 175 are stored in the second partition 172 of the hard disk 17. Of course, the multimedia device driver 174 and the multimedia device application program 175 can also be stored in the first partition 171 of the hard disk 17 or other data storage devices, such as CD, portable hard disk, flash memory sticks, and so on.

The second bus bridge 13 of the computer 100 is connected to a hot key detection interface circuit 20 through a bus 130, and the hot key detection interface circuit 20 is connected to a hot key set 2. The hot key set 2 includes a plurality of hot keys 21, 22, 23, 24, which activate CD player, digital music device, VCD player and TV when actuated by the user.

The hot keys 21, 22, 23, 24 can be defined as control keys for express activation of a multimedia player. The hot keys 21, 22, 23, 24 can be buttons installed on the panel of the corresponding multimedia player or on the computer. The hot keys 21, 22, 23, 24 can also be specific keys on the keyboard of the computer. The specific keys can be decoded by keyboard controller, and identified by the central processing unit.

The second bus bridge 13 of the computer 100 is connected to a multimedia player 3 through the bus 130. The multimedia player 3 includes a CD player, a digital music device, a VCD player, and a TV signal receiving device, all connected to the bus 130 through multimedia device interface.

The second bus bridge 13 of the computer 100 is connected to an audio interface circuit 40 through the bus 130. An audio interface circuit 40 is connected to an audio device 4.

The present invention further comprises a high speed data storage 5, which is connected to the second bus bridge 13 through the bus 130. The high speed data storage 5 can be a memory chip, flash memory or other storage device having a higher access speed than the hard disk.

The high speed data storage 5 stores the second operating system 51 and the kernel program 52 of the second operating system 51. The second operating system can be a Linux-based operating system or other types of operating systems, such as Tiny Windows-based operating system or embedded operating system.

Figure 2:
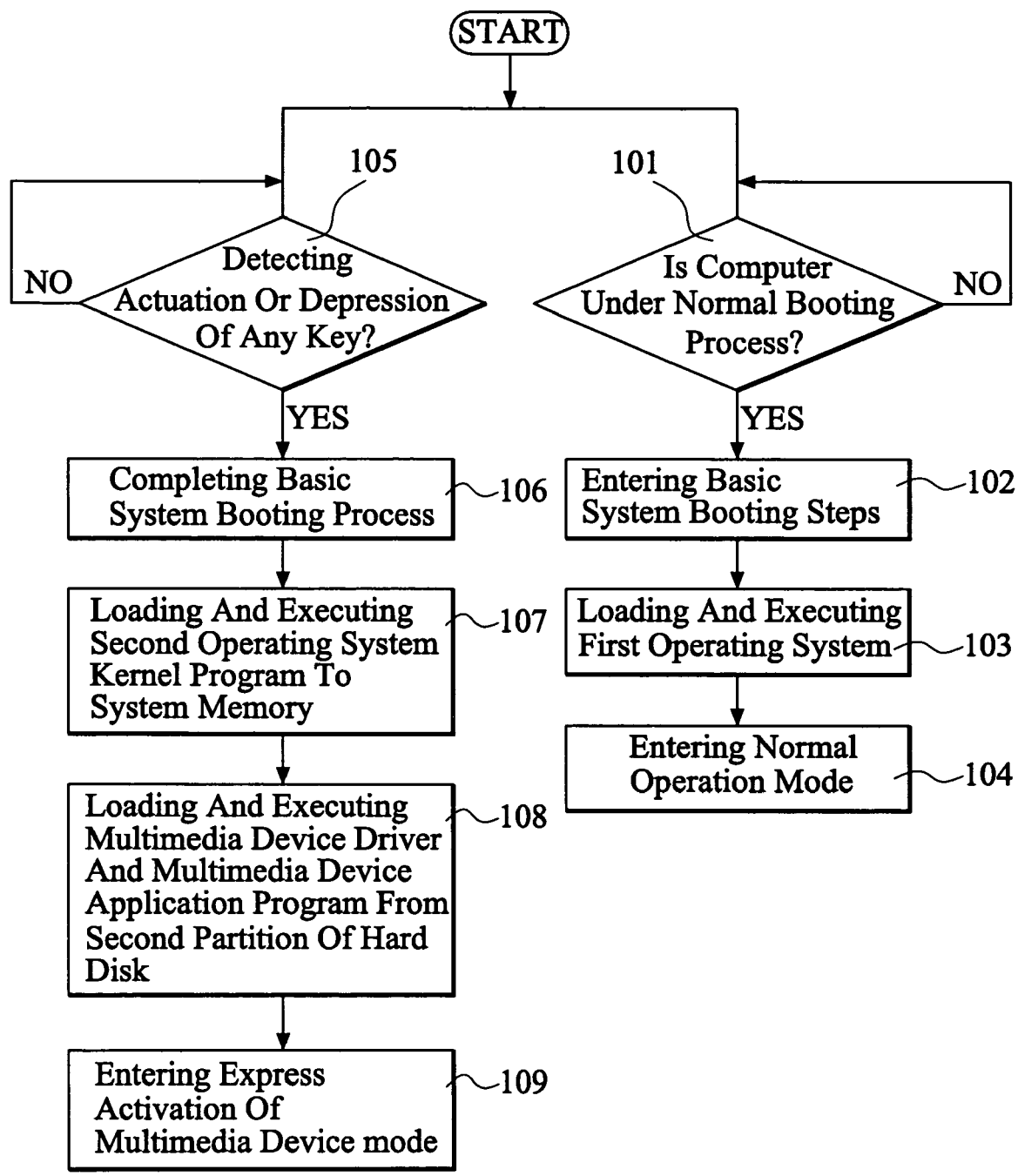
FIG. 2 shows a control flowchart of the embodiment of FIG. 1.

Also referring to FIG. 2, which shows a control flowchart of the embodiment shown in FIG. 1. The following description refers to both FIGS. 1 and 2.

In the present invention, the computer 100 can operate either under the normal booting process, or using express activation of multimedia device. When the computer 100 is under the normal booting process (step 101), the computer 100 enters the basic system booting steps (step 102). That is, the computer 100 loads and executes the BIOS program 161 and the POST program 162 from the BIOS memory 16. After the computer 100 completes initialization and POST programs, the computer 100 loads and executes a first operating system 173 in the first partition 171 of the hard disk 17 (step 103). Thus, the computer 100 enters the normal operation mode (step 104). At this point, the user can operate the computer 100 in a normal operation mode.

When the user intends to execute the multimedia playing function, the user presses any key of the hot key set 2 to activate the associated multimedia device, such as CD player, digital music device, VCD player or TV. That is, when the computer 100 detects actuation or depression of any key of the hot key set 2 (step 105), the computer 100 loads and executes the second operating system 51 and the kernel program 52 from the high speed data storage 5 to the system memory 14 (step 107) after completing the basic system booting process (step 106). The kernel program 52 can be stored in a compressed format in the high speed data storage 5 to save space. In this case, it is necessary to uncompress the kernel program 52 before loading to the system memory 14.

Then, the computer 100 loads and executes the multimedia device driver 174 and the multimedia device application program 175 in the second partition 172 of the hard disk 17 for the multimedia player 3 associated with the hot key being pressed by the user (step 108). Therefore, the computer 100 enters the express activation of multimedia device mode (step 109). In this case, the tedious waiting for the computer 100 to finish normal booting process before activating multimedia device is shortened.

Figure 3:
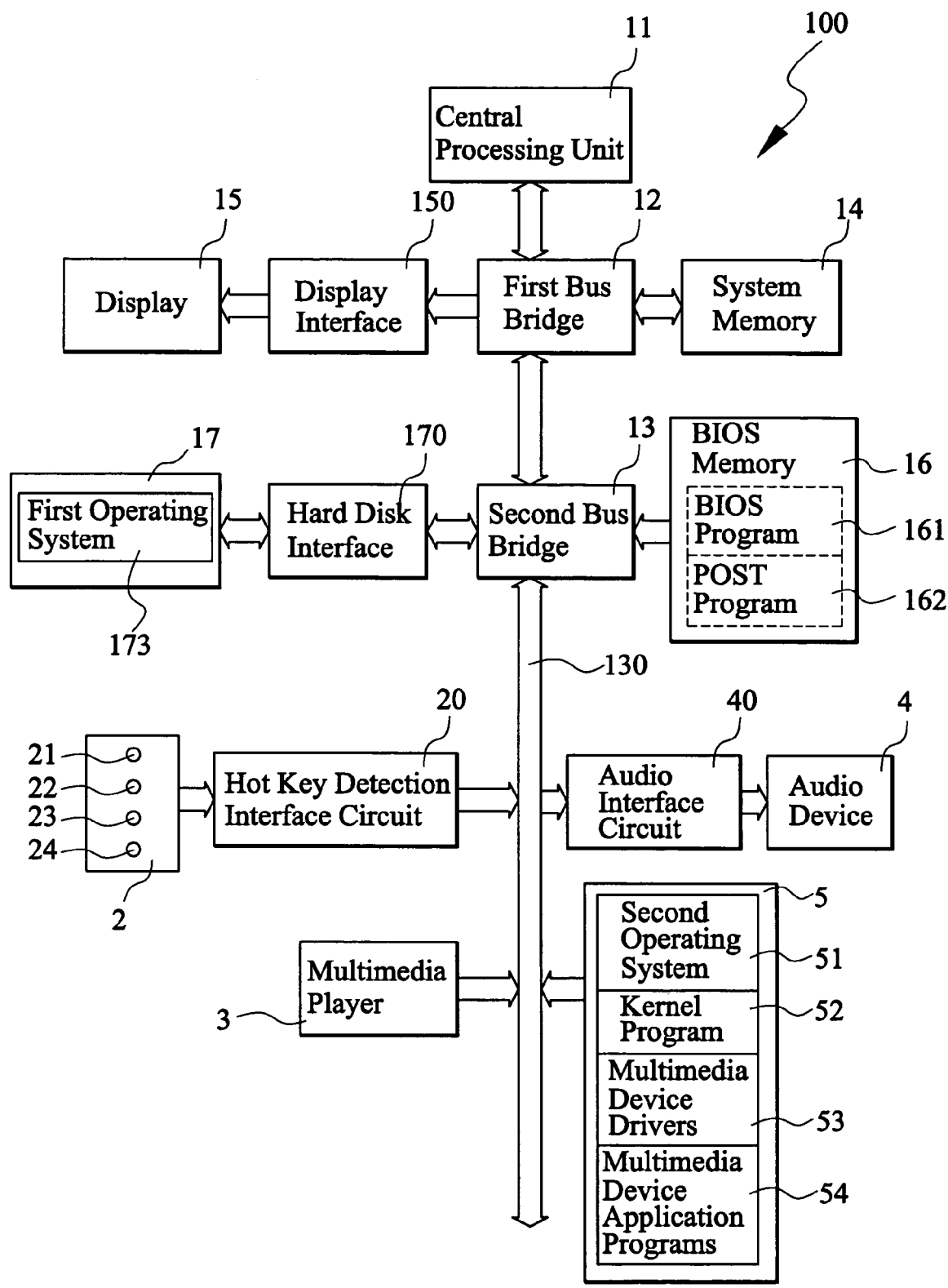
FIG. 3 shows a system functional block diagram of the second embodiment of the present invention.

FIG. 3 show a system block diagram of a second embodiment in accordance with the present invention. Most of the elements in the second embodiment shown in FIG. 3 are the same as those shown in FIG. 1 and the difference resides in that the hard disk 17 is not divided into different segments. The hard disk 17 stores a first operating system 173 and device drivers and application programs supporting a first operating system 173. The high speed data storage 5 stores a second operating system 51, the kernel program 52 of the second operating system 51, the multimedia device drivers 53, and the multimedia device application programs 54.

Figure 4:
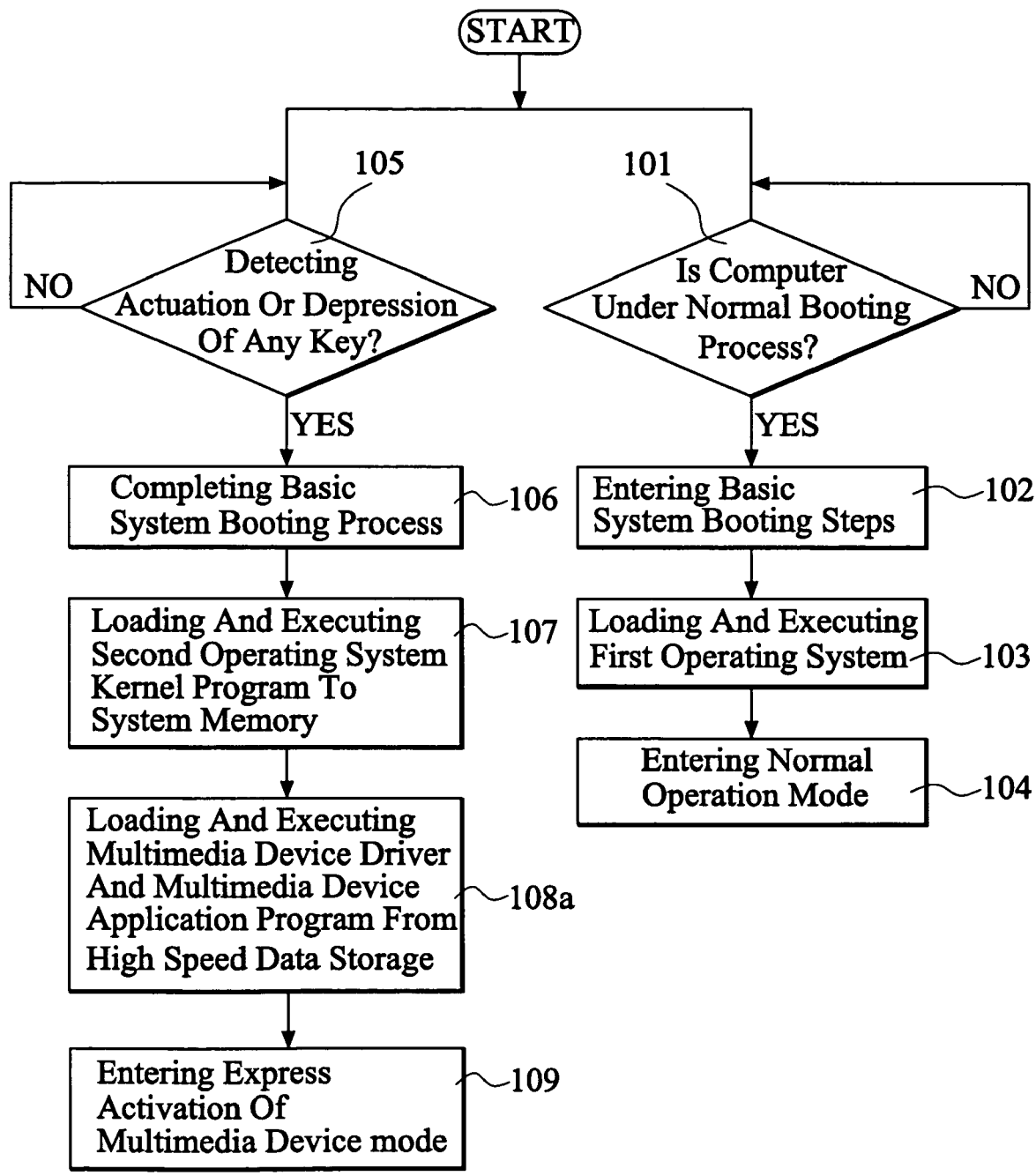
FIG. 4 shows a control flowchart of the embodiment of FIG. 3.

Also referring to FIG. 4, which shows a control flowchart of the embodiment of FIG. 3, in the present embodiment, the computer 100 can also operate either under the normal booting process, or using express activation of multimedia device. When the computer 100 is under the normal booting process (step 101), the computer 100 enters the basic system booting steps. That is, the computer 100 loads and executes the BIOS program 161 and the POST program 162 from the BIOS memory 16. After the computer 100 completes initialization and POST programs, the computer 100 loads and executes the first operating system 173 in the first partition 171 of the hard disk 17 (step 103). Thus, the computer 100 enters the normal operation mode (step 104). At this point, the user can operate the computer 100 in a normal operation mode.

When the user intends to execute the multimedia playing function, the user presses any key of the hot key set 2 to activate the associated multimedia device, such as CD player, digital music device, VCD player or TV. That is, when the computer 100 detects any key of the hot key set 2 is pressed or actuated (step 105), the computer 100 loads and executes the second operating system 51 and the kernel program 52 from the high speed data storage 5 to the system memory 14 (step 107) after completing the basic system booting process (step 106).

Then, the computer 100 loads and executes the multimedia device driver 53 and the multimedia device application program 54 from the high speed data storage 5 for the multimedia player 3 associated with the hot key being pressed by the user (step 108a). Therefore, the computer 100 enters the express activation of multimedia device mode (step 109).

While the invention has been described in connection with what is presently considered to the best mode for carrying out the present invention, it is to be understood that the invention is not to be limited to the disclosed embodiment, but on the contrary, is intended to cover various modifications and equivalent arrangement included within the spirit and scope of the appended claims.

What is claimed is:

1. A method for express execution of multimedia playing for a computer multimedia system, in which a computer of the computer multimedia system comprises a central processing unit, a data storage, a system memory, a BIOS, at least one key, and at least one multimedia device, the data storage storing a first operating system, at least one multimedia device driver, and at least one multimedia device application program, the method comprising the steps of:
   (a) detecting the state of the hot key;
   (b) loading and executing a second operating system kernel program to the system memory from a high speed data storage connected to the central processing unit, by the computer when detecting the hot key being actuated; said loading and executing performed after completion of a basic system booting process of the second operating system;
   (c) loading and executing the multimedia device driver and the multimedia device application program associated with the actuated hot key from the data storage; and
   (d) activating the multimedia device associated with the actuated hot key.

2. The method as claimed in claim 1, wherein the data storage comprises a hard disk.

3. The method as claimed in claim 2, wherein the hard disk is divided into a first partition and a second partition, the first partition storing the first operating system and the second partition storing the multimedia device drivers and the multimedia device application programs.

4. The method as claimed in claim 1, wherein the high speed data storage comprises a memory chip.

5. The method as claimed in claim 1, wherein said high speed data storage comprises a flash memory.

6. A method for express execution of multimedia playing for a computer multimedia system, in which a computer of the computer multimedia system comprises a central processing unit, a data storage, a system memory, a BIOS, at least one hot key, and at least one multimedia device, the data storage storing a first operating system, the method comprising the steps of:
   (a) detecting the state of the hot key;
   (b) loading and executing a second operating system kernel program to the system memory from a high speed data storage connected to the central processing unit, by the computer when detecting the hot key being actuated; said loading and executing performed after completion of a basic system booting process of the second operating system;
   (c) loading and executing a multimedia device driver and a multimedia device application program associated with the actuated hot key from the high speed data storage; and
   (d) activating the multimedia device associated with the actuated hot key.

7. The method as claimed in claim 6, wherein the data storage comprises a hard disk.

8. The method as claimed in claim 6, wherein the high speed data storage comprises a memory chip.

9. The method as claimed in claim 6, wherein the high speed data storage comprises a flash memory.

10. A method for express execution of multimedia playing for a computer multimedia system, in which a computer of the computer multimedia system comprises a central processing unit, a data storage, a system memory, a BIOS, at least one hot key, and at least one multimedia device, the data storage storing a first operating system, the method comprising the steps of:
    (a) detecting the state of the hot key;
    (b) loading and executing a second operating system kernel program to the system memory from a high speed data storage connected to the central processing unit, by the computer when detecting any the hot key being actuated; said loading and executing performed after completion of a basic system booting process of the second operating system;
    (c) loading and executing a multimedia device driver and a multimedia device application program associated with the actuated hot key; and
    (d) activating the multimedia device associated with the actuated hot key.

11. The method as claimed in claim 10, wherein the data storage comprises a hard disk.

12. The method as claimed in claim 10, wherein the multimedia device driver and the multimedia device application program are stored in the data storage.

13. The method as claimed in claim 10, wherein the multimedia device driver and the multimedia device application program are stored in the high speed data storage.

14. The method as claimed in claim 10, wherein the high speed data storage comprises a memory chip.

15. The method as claimed in claim 10, wherein the high speed data storage comprises a flash memory.

* * * * *